US012139332B2

(12) United States Patent
Harrison (10) Patent No.: US 12,139,332 B2
(45) Date of Patent: Nov. 12, 2024

(54) BOLTED RACK BRACKET ASSEMBLY AND REPAIR PROCESS

(71) Applicant: Ronald K. Harrison, Hamilton (CA)

(72) Inventor: Ronald K. Harrison, Hamilton (CA)

( * ) Notice: Subject to any disclaimer, the term of this patent is extended or adjusted under 35 U.S.C. 154(b) by 0 days.

(21) Appl. No.: 18/289,291

(22) PCT Filed: May 4, 2022

(86) PCT No.: PCT/CA2022/050700
§ 371 (c)(1),
(2) Date: Nov. 2, 2023

(87) PCT Pub. No.: WO2022/232932
PCT Pub. Date: Nov. 10, 2022

(65) Prior Publication Data
US 2024/0228161 A1   Jul. 11, 2024

Related U.S. Application Data

(60) Provisional application No. 63/183,904, filed on May 4, 2021.

(51) Int. Cl.
*B65G 1/04* (2006.01)
*A47B 96/14* (2006.01)

(52) U.S. Cl.
CPC ............... *B65G 1/04* (2013.01); *A47B 96/14* (2013.01); *B65G 2201/0267* (2013.01)

(58) Field of Classification Search
CPC .... B65G 1/00; B65G 1/04; B65G 2201/0267; A47B 96/14; A47B 96/1408
See application file for complete search history.

(56) References Cited

U.S. PATENT DOCUMENTS

| 4,064,966 A | 12/1977 | Burton |
| 4,934,893 A * | 6/1990 | Johnson ............ B62B 3/06 414/812 |
| 6,135,419 A * | 10/2000 | Hutson, Jr. ............ B66F 3/24 254/133 R |
| 6,298,537 B1 | 10/2001 | Dion |

(Continued)

FOREIGN PATENT DOCUMENTS

| CA | 2232178 A1 | 1/1999 |
| KR | 10-1312019 B1 | 9/2013 |
| WO | WO-2019/028546 A1 | 2/2019 |

OTHER PUBLICATIONS

International Search Report of the International Searching Authority issued in PCT/CA2022/050700, mailed Aug. 12, 2022; ISA/CA.

*Primary Examiner* — Stanton L Krycinski
(74) *Attorney, Agent, or Firm* — Harness, Dickey & Pierce, P.L.C.

(57) ABSTRACT

A method for replacing damage portions of the column on a bolted pallet rack frame. The assembly is comprised of front and rear vertical columns complete with fixed footplates. Internal bracing is bolted in place which in turn creates the frame structure. A front (aisle side) column is designed as a two-piece column fitted (welded or bolted) with a bracket at a predetermined connection point. The bracket allows for the replacement of a lower portion of the column in the event of damage by simply releasing hardware connections.

2 Claims, 6 Drawing Sheets

(56) References Cited

U.S. PATENT DOCUMENTS

| | | | | |
|---|---|---|---|---|
| 6,332,549 B1 | * | 12/2001 | MacDonald | A47B 47/027 |
| | | | | 211/183 |
| 6,405,884 B1 | * | 6/2002 | Dion | A47B 47/02 |
| | | | | 211/183 |
| 6,557,712 B2 | * | 5/2003 | Gruber | A47B 47/027 |
| | | | | 211/189 |
| D490,678 S | * | 6/2004 | Dion | D8/381 |
| 7,249,442 B2 | * | 7/2007 | Pellegrino | A47F 5/0018 |
| | | | | 248/564 |
| 7,311,487 B1 | * | 12/2007 | Crossley | B65G 7/02 |
| | | | | 414/458 |
| 8,596,613 B2 | * | 12/2013 | Arensdorf | B62B 5/0086 |
| | | | | 254/10 R |
| 8,672,296 B2 | * | 3/2014 | Cozza | B66F 5/04 |
| | | | | 254/2 B |
| 9,723,925 B1 | * | 8/2017 | Tsai | A47B 45/00 |
| 10,807,845 B2 | * | 10/2020 | Weber | B60D 1/665 |
| 10,974,352 B1 | | 4/2021 | Klinger | |
| 11,690,446 B2 | * | 7/2023 | Harrison | A47B 47/021 |
| | | | | 211/153 |
| 11,691,229 B2 | * | 7/2023 | Klinger | B23P 19/041 |
| | | | | 211/183 |
| 2004/0079718 A1 | * | 4/2004 | Gagne | A47B 91/00 |
| | | | | 211/189 |
| 2005/0150853 A1 | * | 7/2005 | Kimball | A47B 91/00 |
| | | | | 211/187 |
| 2009/0148267 A1 | * | 6/2009 | Crossley | B65G 1/02 |
| | | | | 414/800 |

* cited by examiner

BOLTED RACK BRACKET ASSEMBLY AND REPAIR PROCESS

CROSS-REFERENCE TO RELATED APPLICATIONS

This application is a 371 U.S. National Phase of International Application No. PCT/CA2022/050700, filed on May 4, 2022, which claims the benefit of U.S. Provisional Application No. 63/183,904, filed on May 4, 2021. The entire disclosures of the above applications are incorporated herein by reference.

FIELD OF INVENTION

This invention relates to bolted (knockdown) pallet racking systems that are used to store palletized material.

BACKGROUND OF INVENTION

The use of pallet racking systems has been commonplace in the storing of palletized material for many decades. The systems have typically been manufactured as roll-formed systems with either welded or bolted connections between columns and a bracing material. Horizontal load beams are typically fixed via hooks on the beam bracket that engage with the slots on the columns. For an example of such refer to U.S. Pat. No. 4,064,966

With the ever-increasing demand for additional storage space, the racking systems are being designed to greater heights and required to carry ever increasing loads. To further increase storage density, forklift aisles are being reduced to their safest operating limits thus providing more area for pallet racking. With greater heights, narrower aisles and ever-increasing volumes, the opportunity exists for damage to occur by way of accidental contact with the forklift.

Racking systems are very susceptible to damage with the majority of occurrence being at the lower portion of the system. The damage can occur to the front column, the internal bracing and in rare cases the rear column. Damage to the horizontal load beams is also typical however not addressed by this invention. As the lower portion of the frame is the most critical to the structural stability of the system any damage must be addressed immediately. The first step is to offload the product from the damaged location. Once the product has been safely removed various repair or replacement options exists in the marketplace today.

A first option is the complete replacement of the damaged frame. This is not only costly and time consuming it also creates a significant disruption to the operations. The storage positions must be locked out until the correct frame can be sourced from the manufacture. If the facility does not have any spares on site this can take weeks if not months to procure. Once the correct frame has been delivered, a qualified installation crew must be scheduled to dismantle the bays on either side to release the damaged frame. With a new frame in position the load beams on either side of the bay are then re-installed and finally palletized material can the be reloaded. As the frames continue to get taller and heavier, it should be noted that a significant amount of certification and skill set is required to complete this procedure.

A second option is to repair the damaged section of the column or bracing with various options being available. The options range from a full boot/brace which encapsulates the damaged area to the cutting and removal of the damaged section and replacing with a structural repair kit.

Both options have their limitations especially when the horizontal load beams are positioned at the same height as the repair kit. This typically requires the load beam bracket to be cut off and the beam drilled to accept a collar which wraps the beam and is finally secured via drilling holes through the beam ends to accept a bolted connection. The collar is then tek screwed into the repair kit and/or holes drilled through the repair kit to accept a bolted connection. This raises concerns with the stability of this connection as well as it greatly reduces the ease of reprofiling the beam to a different location if ever required.

If the damage to the column material is significant, a boot/brace will not be an option as the column material must be able to be worked back into its initial position such that the boot/brace will be able to fit over the damaged portion of the column. In this scenario a repair kit or frame replacement is required.

When using a boot/brace or repair kit in the field, it requires the cutting of the damaged section out of the column. This causes a potential fire risk which in turn requires a hot work permit. The cutting and/or drilling of metal material also causes metal shavings to be introduced into the application. In a food grade, pharmaceutical or various other applications this is simply not allowed. Welding is also typically prohibited for the same reasons.

Still further, the connection between the structural repair kit and the existing frame must be designed such that it connects to all the various racking types/dimensions available in the marketplace today. All these connections much be engineer reviewed and approved prior to the fabrication and installation of the repair kit itself.

Another issue arises from the fact that the design must take into consideration the loading conditions that the repair kit will be subjected to which again is a sizeable engineering undertaking which adds further complexity, time, and money to the process. Depending on region/location that the system is installed, various design codes and geographical conditions must be factored into the engineering review.

It should also be noted that boots/braces or repair kits are typically more durable than the original material being replaced. Thus, they have a propensity for transferring impact forces to just above the repaired location. This creates a weakest link scenario wherein the impact forces migrate up the repaired section until it finds the weakest link.

As has been proposed in the art to provide pallet rack repair system—see U.S. Pat. No. 6,298,537, such repair systems add significant complexities, engineering requirements and working hazards to the repair process.

When you add up the number of variables and shortcomings of both options it is simply more economical and safer to replace the damaged frame with a new frame designed to the same specifications as the one being replaced.

SUMMARY OF THE INVENTION

It is an object of the present invention to provide a method for the repair of a bolted pallet racking frame, which method minimizes the downtime, complexity, cost, and owner's liability when repairing a damaged column.

It is a further object of the present invention to provide a repair system for the repair of existing bolted pallet racking frames currently installed in the field.

A still further object of the present invention to provide a method for repair in which to replace the lower portion of the front column while the structure above remains in place.

Still another object of the present invention is to provide a method in which once the column is repaired the existing horizontal load beam does not have to be modified to be positioned within the area of repair.

Yet another object of the present invention is to provide a method for repair such that forklifts and scissor lifts are not required during the repair process.

Still yet another object of the present invention is to provide a method for repair such that the replacement column material is the same as the original material such that the racking system functions as originally designed and intended.

According to one aspect of the present invention, there is provided a two-piece bracket assembly either welded or bolted at a predetermined height on the front column. A top bracket assembly for connection to a bottom of said upper column portion and a bottom bracket assembly for connection to a top of said lower column portion;

said top bracket assembly having a horizontally extending lower flange with an upper column engaging member extending upwardly therefrom, said upper column engaging member being dimensioned to be snugly received within said bottom of said upper column portion; The column engaging member is designed such that the hooks from the horizontal load beam will engage with the slots in the column without interference above or below the horizontally extending lower flanges. As would be the case in a new system design where the bracket assembly is welded into position and hardware is not required to connect the bracket assembly to the upper and lower columns The column engaging members, being either upper or lower, will be complete with front and side holes aligned with the slots on the front face of the column and the holes on the side of the column. Theses holes would facilitate the hardware if a bolted connection were preferred as in the case of a retrofit of an existing system. It will be understood that columns will have different dimensions, slot and hole locations and the bracket assembly will be configured accordingly.

The horizontally extending lower flange would be marginally wider than the column to allow for the flange to be welded to the column. The top and bottom horizontally extending lower flange will also provide for aligned hole locations to accept bolted connections when mated together. This is the connection point between the top and bottom portion of the column that would allow for the bottom portion of the column to be replaced when damaged once the hardware is released. The top horizontally extending lower flange will have an additional reveal complete with a hole location which provides the connection point between the jack and top bracket assembly as required during the repair process.

The location of the bracket assembly is determined by the position of the first load beam from the floor. This is critical as the installation of the bracket assembly should be positioned above the first load beam as the beam connection will limit the impact forces from migrating up the column and transferring into the bracket assembly connection. This in turn keeps the damage into the serviceable area being below the bracket assembly.

When designing for a new application, all elevation types should be reviewed to determine the height of the highest load beam such that a bracket assembly can be positioned at one height for all frames throughout the entire facility. This in turn makes replacement components easy to manufacture as one size fits all.

Further, it is preferred to position the bracket assembly near the connection point of either the horizontal and/or diagonal brace to the front column as this creates a stronger connection between the upper and lower column.

As previously mentioned, damage typically occurs to the lower portion of the system due to forklift impact or various material handling equipment. When damage does occur and more specifically to the front column, this invention provides for an efficient, safe, and cost-effective repair system.

Simply once a damaged column has been identified, all palletized material is to be offloaded. A trained individual then removes the bolted connections which secure the bracing to the front column only up to the height of the bracket assembly. The bracing is either lowered or raised to allow sufficient room to position a jack into the available hole location of the top horizontally extending lower flange. The jack will have a bolt welded vertically to the top screw to allow for a secure bolted connection between the jack and the horizontal plate.

With the jack securely bolted into position, the racking system is stabilized and it is safe to remove the damaged front column. The remaining pieces of hardware on the mated horizontally extending lower flange can be released as well as the screw anchors located on the footplate. With the hardware removed and the load transferred to the jack, the front column can then be removed.

A replacement column complete with the bottom portion of the bracket assembly is then installed along with the required hardware. The replacement column would be designed and fabricated to the exact specifications of the one being replaced. Finally, the bracing is re-installed and secured as required as well as the screw anchors. The palletized material can then be reloaded.

This identical replacement of parts allows for the horizontal load beams to be re-installed without modification within the area of repair keeping the integrity of the column to beam connection as per the original design requirements.

If a standard bolted frame installed in the field has received damage to the front or rear column this invention further provides for a repair system that can be completed on-site at the location of damage without removing the upper portion of the system. Further, this invention allows for the installation of both the top bracket assembly into the upper portion of the column as well as the lower portion of the column complete with the bottom bracket assembly and fixed footplate.

As per the reasons explained above, the replacement lower portion of the column is designed such that it will be positioned above the first load beam from the floor and near the connection point of the horizontal and/or diagonal bracing. The bottom bracket assembly will be welded into the top of the column and footplates fixed to the bottom of the column. The column and footplates will be made of the same material and dimensions as the one it is replacing.

With product unloaded the jack is bolted to the existing front column with a simple "L" bracket. All internal bolted connections securing the horizontal and/or diagonal bracing to both columns can be released and the material removed.

At this point the damage portion of the column will need to be removed by the way of cutting which will occur at a predetermined height dictated by the height of the replacement column. With the column material cut the anchors need to be released and the damaged column material removed.

The top bracket assembly will then be inserted into the exposed bottom portion of the existing column. Hardware will then be placed through the front and side of the column as well as the bracket assembly thus creating a secure bolt joint.

With the top bracket assembly installed, the bottom replacement column can be positioned in place and the hardware installed into the mated horizontally extending lower flange. The bracing is then re-installed and secured as required as well as the screw anchors.

The "L" bracket and jack can be released, and any horizontal load beams installed if and where required. The palletized material can then be reloaded. This invention allows for the horizontal load beam to be re-installed without modification as the replacement column material and dimensions are the same as the original piece that is being replace. This is different than any other repair kit offering in the marketplace today.

It should also be noted that this bracket assembly and repair process can be adapted to a structural pallet racking system such that the lower portion of the front column could be released and replaced in the event of damage. The structural system comprised of channel, angle and possibly tube steel would have a frame with the lower portion, if not all, of the bracing being of a bolted design. The upper and lower engaging member would invariable be different in its design however it would still allow for the horizontally extending upper and lower flanges to be mated together and fastened via hardware connections. The hardware connections once released would allow for the upper and lower bracket assemblies to part from one another providing for the replacement of the lower front column.

DESCRIPTION OF THE PREFERRED EMBODIMENTS

Figure 1:
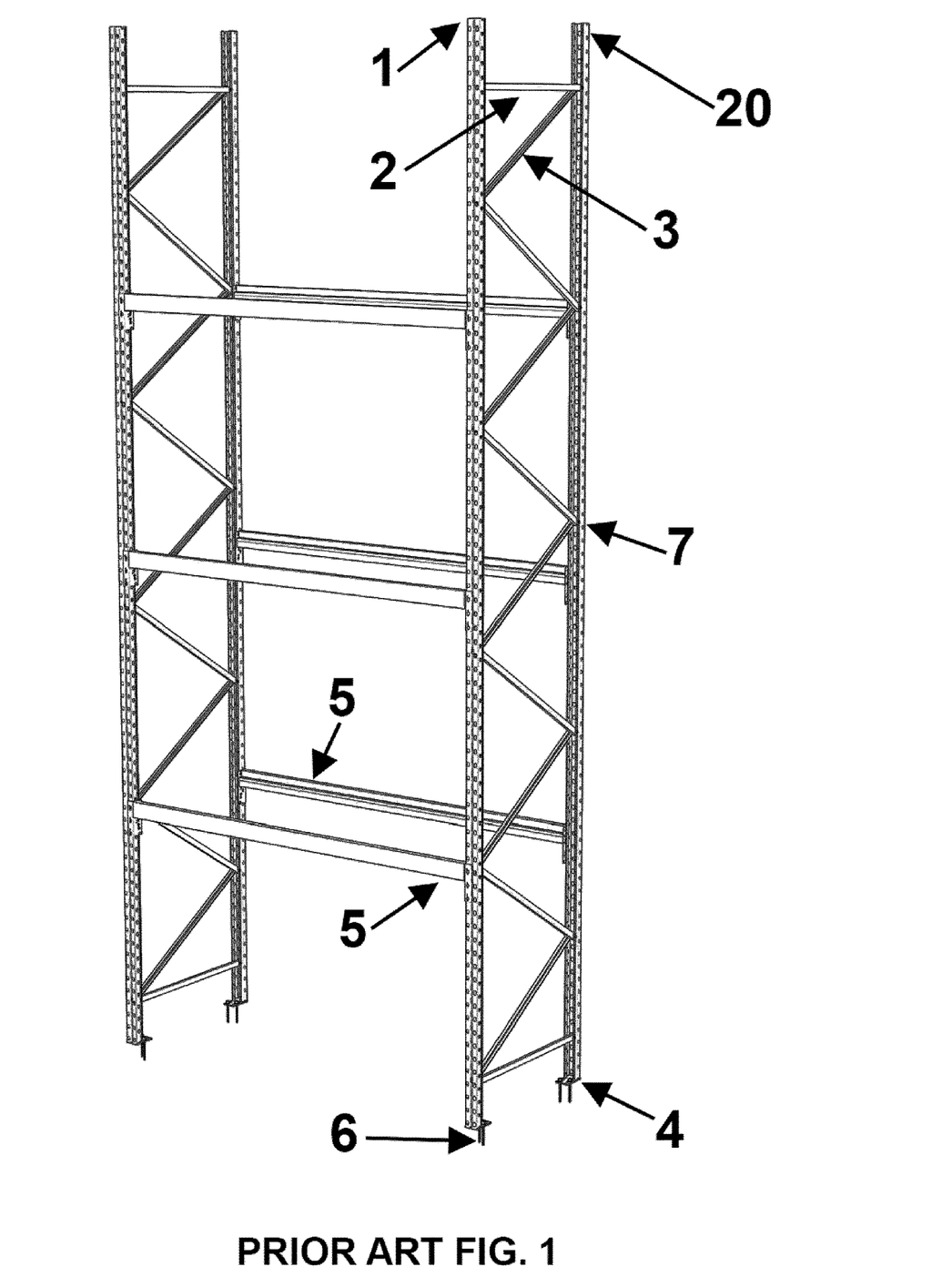
FIG. 1 is a side perspective view of a prior art bolted pallet racking system.

FIG. 1 shows an example of a prior art bolted pallet racking system that may be manufactured or retrofitted to make rack in accordance with the present invention. A preferred embodiment of the present invention is shown in FIGS. 2-6.

FIG. 1 has a multitude of front 1 and rear columns as well as interconnected horizontal load beams 5. Each pair of front 1 and rear 20 columns have both horizontal forward-to-rear braces 2 and diagonal forward-to-rear braces 3 which are secured to the columns with bolted connections 7. Each pair of front and rear column 1 extends from a fixed footplate 4 typically secured to an underlying slab by anchors 6.

As previously discussed above, this bolted pallet rack system is very susceptible to damage from accidental forklift impact especially the front 1 column at the lower level. The complete replacement of the frame is expensive, time consuming and disruptive to operations.

Figure 2:
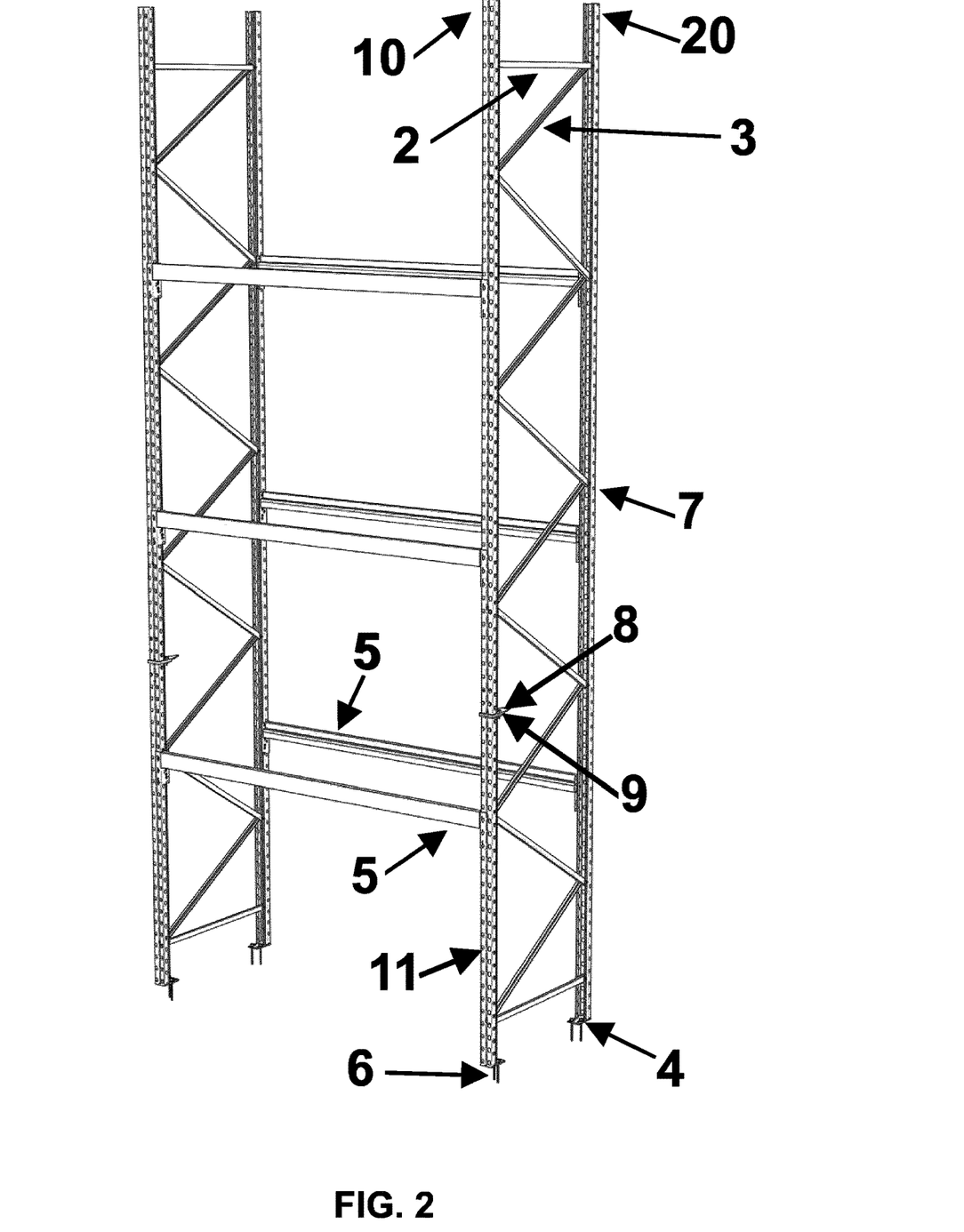
FIG. 2 is a side perspective view of a first embodiment of a rack made in accordance with the present invention.

FIG. 2 shows an example of a preferred embodiment of a bolted pallet racking system made up of a front column complete with an upper portion 10 as well as a lower portion 11. The upper portion has a top bracket assembly 8 secured to a bottom of the column 10. The lower portion has a bottom bracket assembly 9 secured to a top of the column 11. This front column may be made in this form initially, or it may be made by retrofitting the prior art bolted pallet rack of FIG. 1. This bolted pallet rack also has a rear column 20, horizontal forward-to-rear braces 2 and diagonal forward-to-rear braces 3 which are secured to the columns with bolted connections 7. Horizontal load beams 5 are interconnected to the upper and lower portions of the front columns 10, 11 as well as the rear columns 20.

Figure 3:
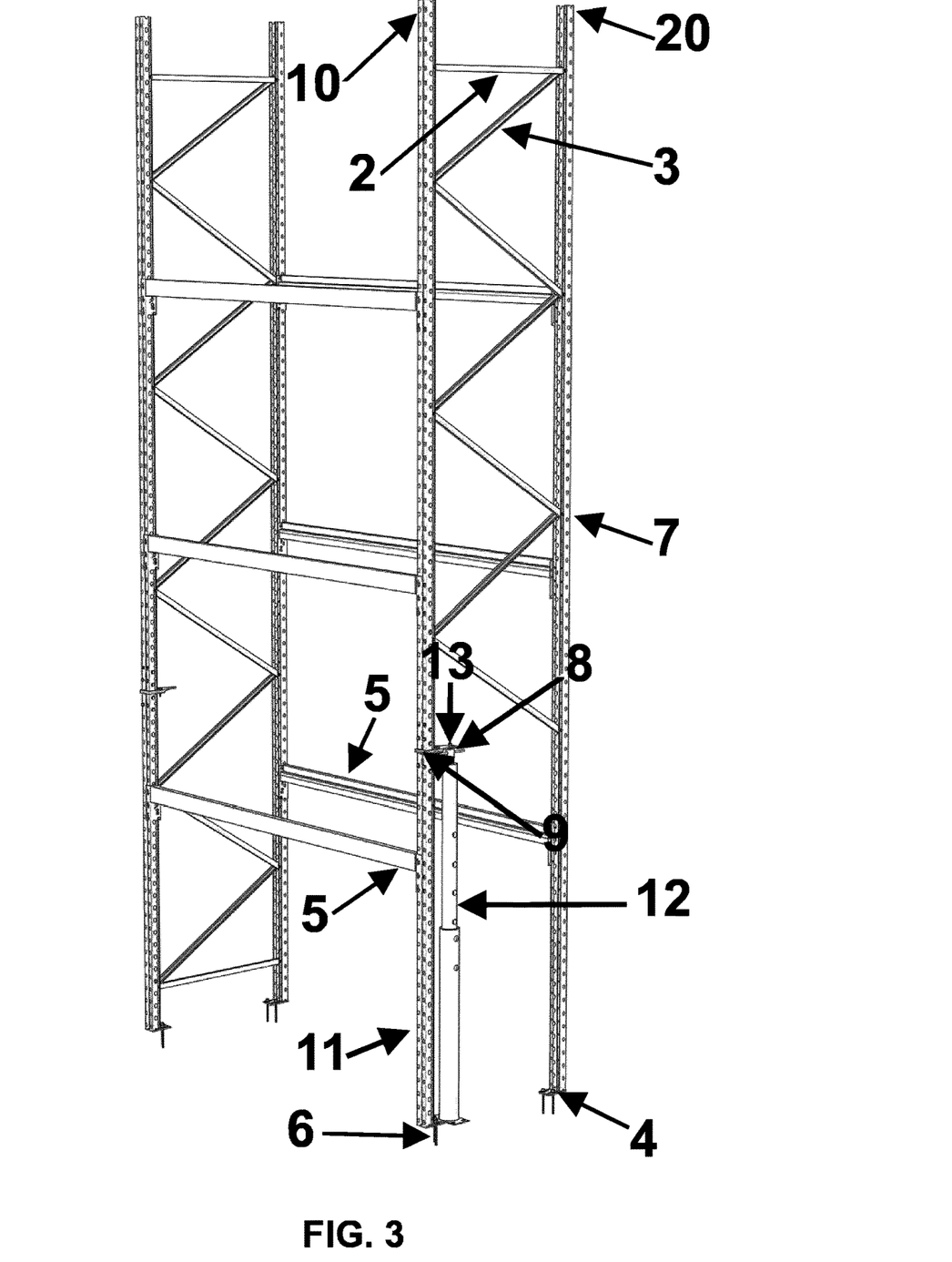
FIG. 3 is a side perspective view showing diagonal bracing removed up to a bracket assembly with a jack secured into position.

FIG. 3. shows a jack 12 secured to the horizontally extending lower flange of the top bracket assembly 8 by the way of a bolted connection 13. The jack once installed, transfers the load from the upper portion of the column 10 to the floor making the lower portion of the column 11 redundant.

Figure 4:
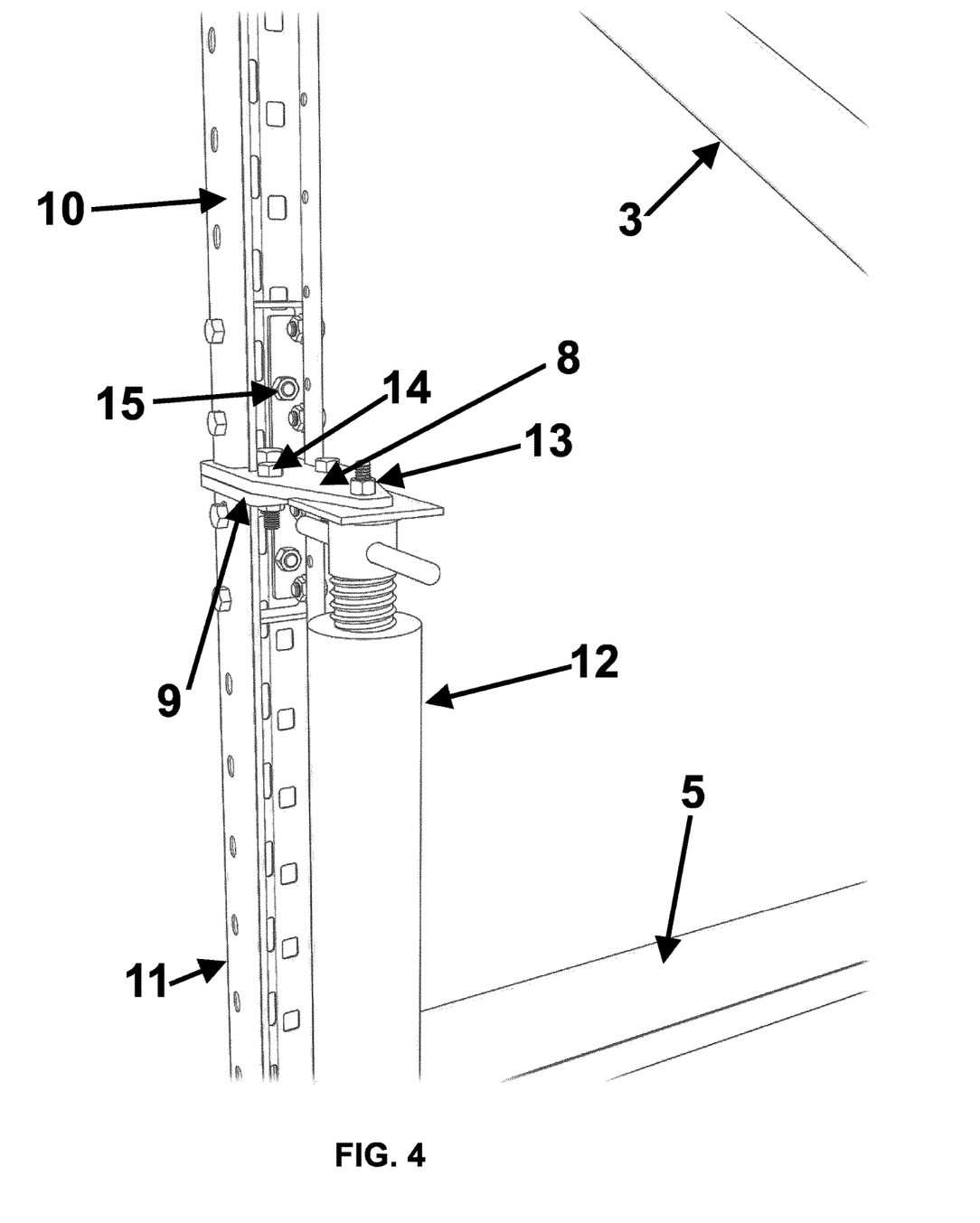
FIG. 4 is an enlarged perspective view of a top and a bottom bracket assembly on a front column complete with the jack secured to a top horizontally extending lower flange as would be the case when under repair.

FIG. 4. shows an enlarged view of the top and bottom bracket assembly 8, 9 with the jack 12 secured with a bolted connection 13. The top and bottom bracket assembly 8, 9 is shown as being secured by bolted connections 15 on both the front and side of the upper and lower portion of the column. If made initially the top and bottom bracket assembly 8, 9 could either be bolted 15 or welded into position. The top and bottom horizontally extending lower flange being part of assembly 8, 9, is secured by bolted connections 14. These bolted connections 14 will be released to allow for the removal of the lower portion of the column 11 and corresponding bottom bracket assembly 9. The anchors 6 installed through a footplate 4 into the slab would also require releasing to remove the components as described above. The horizontal load beams 5 should be the first component removed during the repair process and the last thing to be re-installed.

Figure 5:
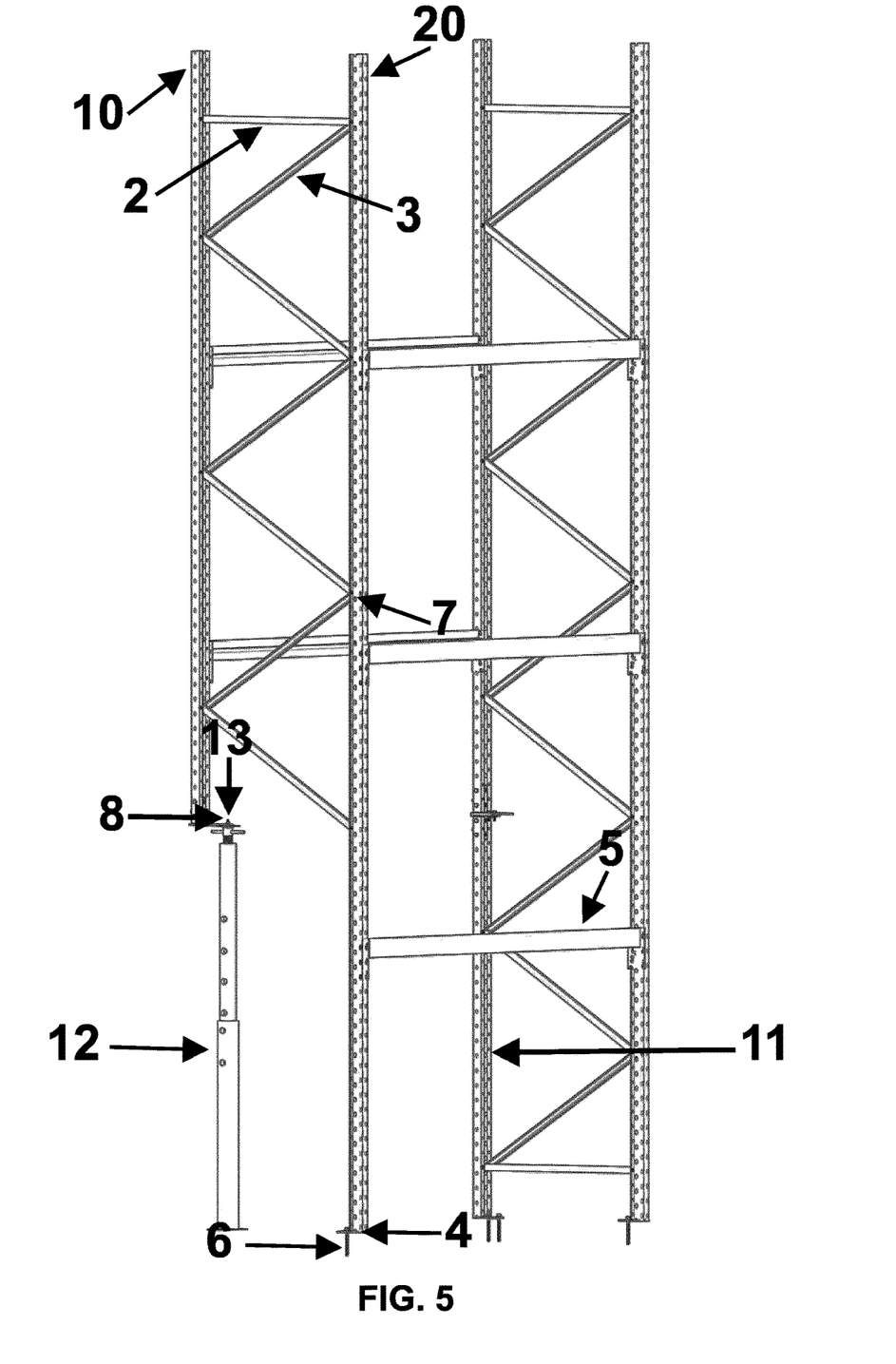
FIG. 5 is a side perspective view of a lower portion of the front column being repaired while an upper portion of the column is being supported by the secured jack.

FIG. 5. shows the load from the upper column 10 being transferred into the jack 12 which is secured to the top bracket assembly 8 with a bolted connection 13. The lower portion of the column 11 and corresponding bottom bracket assembly 9 have been removed to allow for a replacement to be installed.

Figure 6A:
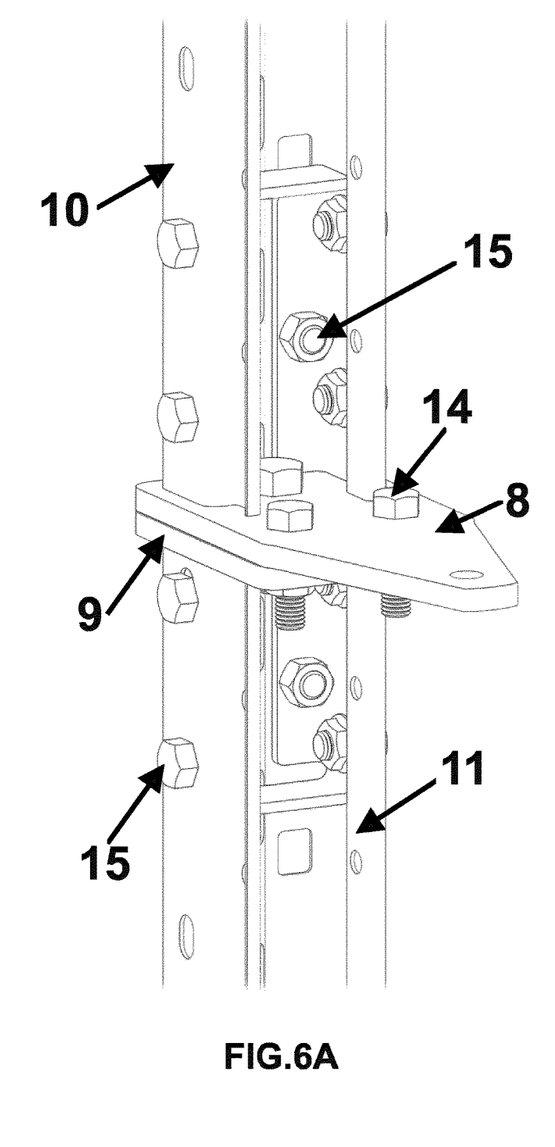
FIG. 6A is an enlarged perspective view of the top and bottom bracket assembly installed in the upper and lower portions of the front column respectively; and, FIG. 6B is an enlarged perspective view of both the top and bottom bracket assembly complete with the column engaging member and horizontally extending lower flange prior to being installed in the upper and lower portion of the front column.

FIG. 6A shows the top and bottom bracket assemblies 8 and 9 respectively as bolted 15 into position of the upper 10 and lower 11 portion of the front column and secured to each other with an additional bolted connection 14.

Figure 6B:
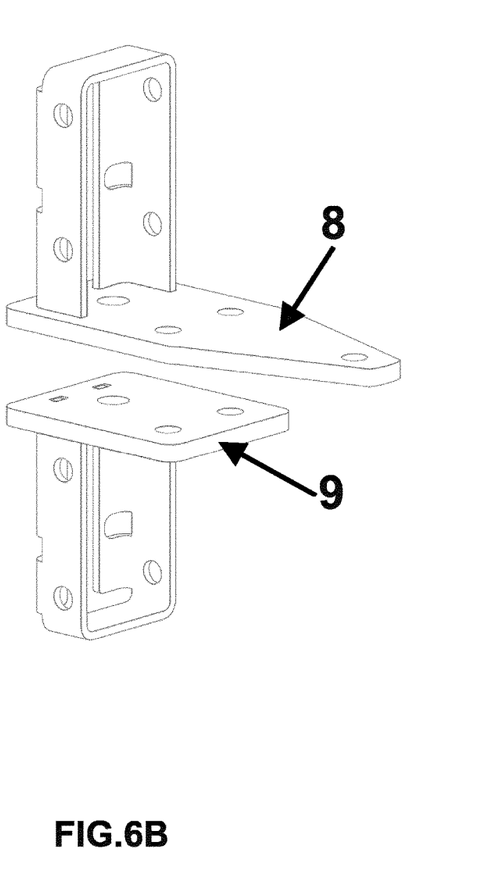

FIG. 6B. shows an enlarged view of the top and bottom bracket assemblies 8, 9 respectively prior to installation.

It will be understood that the above-described embodiments are for purposes of illustration only and that changes and modifications may be made thereto without departing from the spirit and scope of the invention as defined by the claims below.

What is claimed:

1. A connector assembly for connecting an upper column portion of a racking system to a lower column portion, said connector assembly comprising:

a top bracket assembly for connection to a bottom of said upper column portion and a bottom bracket assembly for connection to a top of said lower column portion;

said top bracket assembly having a horizontally extending lower flange with an upper column engaging member extending upwardly therefrom, said upper column engaging member being dimensioned to be snugly received within said bottom of said upper column portion;

said upper column engaging member having bolt holes extending therethrough for alignment with corresponding bolt holes in said upper column portion for bolted securement of said top bracket assembly to said upper column portion;

said bottom bracket having a horizontally extending upper flange with a lower column engaging member extending downwardly therefrom, said lower column engaging member being dimensioned to be snugly received within said top of said lower column portion;

said lower column engaging member having bolt holes extending therethrough for alignment with corresponding bolt holes in said lower column portion for bolted securement of said bottom bracket assembly to said lower column portion;

said lower and upper flanges having corresponding bolt holes extending therethrough for bolted securement of said lower flange to said upper flange;

said lower flange having a jack engaging portion which extends beyond said upper flange to allow said lower flange to be secured to a jack while said upper and lower flanges are bolted together.

2. A method for replacing a lower column portion of a racking system wherein the lower column portion is secured to an upper column portion with the connector assembly of claim 1, said method comprising the steps of:

i. removing any load supported by said racking system;
ii. bolting a jack post to said jack engaging portion of said lower flange and adjusting said jack to support said upper column portion;
iii. removing any horizontal and diagonal bracing secured to said lower column portion;
iv. unbolting said lower flange from said upper flange;
v. removing any anchoring bolts extending between said lower column portion and an underlying slab;
vi. removing said lower column portion;
vii. replacing said lower column portion;
viii. bolting said lower flange to said upper flange;
ix. replacing said anchoring bolts;
x. reinstalling said horizontal and diagonal bracing;
xi. removing said jack; and,
xii. securing said anchoring bolts.

* * * * *